(12) United States Patent
Sugishita et al.

(10) Patent No.: US 9,926,859 B2
(45) Date of Patent: Mar. 27, 2018

(54) VEHICLE CONTROL DEVICE

(71) Applicants: AISAN KOGYO KABUSHIKI KAISHA, Obu-shi, Aichi-ken (JP); TOYOTA JIDOSHA KABUSHIKI KAISHA, Toyota-shi, Aichi-ken (JP)

(72) Inventors: Masakazu Sugishita, Tokai (JP); Kenji Hashimoto, Nagoya (JP)

(73) Assignees: AISAN KOGYO KABUSHIKI KAISHA, Obu-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/311,567

(22) PCT Filed: Jun. 16, 2015

(86) PCT No.: PCT/JP2015/067275
§ 371 (c)(1),
(2) Date: Nov. 16, 2016

(87) PCT Pub. No.: WO2015/198917
PCT Pub. Date: Dec. 30, 2015

(65) Prior Publication Data
US 2017/0101940 A1    Apr. 13, 2017

(30) Foreign Application Priority Data

Jun. 24, 2014  (JP) ................................ 2014-129179

(51) Int. Cl.
*F02D 13/04*   (2006.01)
*F02D 41/00*   (2006.01)
(Continued)

(52) U.S. Cl.
CPC ......... *F02D 13/04* (2013.01); *F02D 19/0642* (2013.01); *F02D 41/0002* (2013.01);
(Continued)

(58) Field of Classification Search
CPC ...... F02D 13/04; F02D 19/0642; F02D 41/00; F02D 41/002; F02D 41/0027;
(Continued)

(56) References Cited

U.S. PATENT DOCUMENTS 6,557,524 B2 *  5/2003  Tsunooka ................ B60T 13/52
                                                      123/179.18
8,989,992 B2 *  3/2015  Lippok ................... B60T 13/662
                                                        701/112
(Continued)

FOREIGN PATENT DOCUMENTS

JP    H07-247866 A    9/1995
JP    2002-021604 A   1/2002
(Continued)

*Primary Examiner* — Hieu T Vo
(74) *Attorney, Agent, or Firm* — Oliff PLC (57) ABSTRACT

A control device calculates an estimate of negative intake pressure based on the relationship between the rotation speed of a crankshaft and a throttle opening degree (Step S24). Then, the control device sets the estimate PE of the negative intake pressure, which is calculated in Step S24, to a greater value as combustion efficiency of CNG used in engine operation becomes higher (Step S25). When the corrected estimate PE of the negative intake pressure becomes smaller than or equal to a reference value PTh (Step S26: YES), the control device starts a negative pressure recovery procedure (Step S27).

6 Claims, 3 Drawing Sheets

(51) Int. Cl.
  *F02D 41/24*  (2006.01)
  *F02D 19/06*  (2006.01)
  *F02D 41/14*  (2006.01)
  *B60T 13/52*  (2006.01)

(52) U.S. Cl.
  CPC ..... *F02D 41/0027* (2013.01); *F02D 41/1454* (2013.01); *F02D 41/2438* (2013.01); *B60T 13/52* (2013.01); *F02D 2200/501* (2013.01)

(58) Field of Classification Search
  CPC ............ F02D 41/1454; F02D 41/2438; F02D 2200/501; B60T 13/52
  See application file for complete search history.

(56) References Cited

U.S. PATENT DOCUMENTS

| | | | |
|---|---|---|---|
| 2001/0035159 A1 | | 11/2001 | Tsunooka |
| 2013/0332041 A1* | | 12/2013 | Kim ........................ B60T 8/441 701/70 |

FOREIGN PATENT DOCUMENTS

| | | | | |
|---|---|---|---|---|
| JP | 2010-185426 A | | 8/2010 | |
| JP | 2012006511 A | * | 1/2012 | .............. B60T 17/02 |
| JP | 2013-163987 A | | 8/2013 | |
| JP | 2013-231427 A | | 11/2013 | |

* cited by examiner

VEHICLE CONTROL DEVICE

TECHNICAL FIELD

The present invention relates to a control device for a vehicle having an internal combustion engine operated using gas fuel and a booster device that boosts brake manipulation force using negative intake pressure in an intake passage of the engine.

BACKGROUND ART

Patent Document 1 discloses a vehicle including an internal combustion engine operated using gas fuel such as CNG (Compressed Natural Gas). When the engine of this vehicle is in idle operation, the opening degree of a throttle valve arranged in an intake passage is controlled to a first opening degree. If deceleration is requested when the vehicle runs, gas fuel supply to the engine is prohibited and the opening degree of the throttle valve is controlled to be smaller than the first opening degree. This increases negative intake pressure at the downstream side of the throttle valve in the intake passage, thus increasing the booster pressure of the booster device. As a result, the booster device appropriately boosts the manipulation force of a brake pedal applied by the driver. In this case, the smaller the pressure at the downstream side of the throttle valve in the intake passage, the greater the negative intake pressure. The booster pressure is a value based on the difference between the negative intake pressure and the atmospheric pressure.

A vehicle known as one such vehicle having an internal combustion engine operated using gas fuel estimates the negative intake pressure and, when the estimate becomes smaller than or equal to a reference value, starts a negative pressure recovery procedure by which the booster pressure is increased. The greater the engine speed, the more likely the negative intake pressure is to be great. The smaller the opening degree of the throttle valve, the more likely the negative intake pressure is to be great. The opening degree of the throttle valve substantially corresponds to the depression amount of an accelerator pedal. Therefore, the negative intake pressure may be estimated using the depression amount of the accelerator pedal, instead of the opening degree of the throttle valve.

However, if the negative intake pressure is estimated and a timing for starting the negative pressure recovery procedure is determined through comparison between the estimate and a reference value, such timing is likely to vary if estimation accuracy of the negative intake pressure is small.

PRIOR ART DOCUMENT

Patent Document

Patent Document 1: Japanese Laid-Open Patent Publication No. 2013-231427

SUMMARY OF THE INVENTION

Problems That the Invention is to Solve

Accordingly, it is an objective of the present invention to provide a control device for a vehicle capable of accurately estimating negative intake pressure at a downstream side of a throttle valve in an intake passage and determining a timing for starting a negative pressure recovery procedure appropriately.

Means for Solving the Problems

To solve the above-described problem, provided is a control device for a vehicle having an internal combustion engine operated using gas fuel and a booster device that boosts brake manipulation force using negative intake pressure at a downstream side of a throttle valve in an intake passage. The control device includes a negative pressure estimating section that calculates an estimate of the negative intake pressure based on the relationship between the opening degree of the throttle valve or the depression amount of an accelerator pedal and the engine speed and a recovery control section that determines, based on the estimate of the negative intake pressure, a timing for starting a negative pressure recovery procedure by which booster pressure of the booster device is increased. The control device also includes a negative pressure correcting section that sets the estimate of the negative intake pressure calculated by the negative pressure estimating section to a greater value as combustion efficiency of the gas fuel used in engine operation becomes higher. When the estimate of the negative intake pressure that has been corrected by the negative pressure correcting section becomes smaller than or equal to a reference value, the recovery control section starts the negative pressure recovery procedure.

MODE FOR CARRYING OUT THE INVENTION

An embodiment of a control device for a vehicle according to the present invention will now be described with reference to FIGS. 1 to 4.

Figure 1:
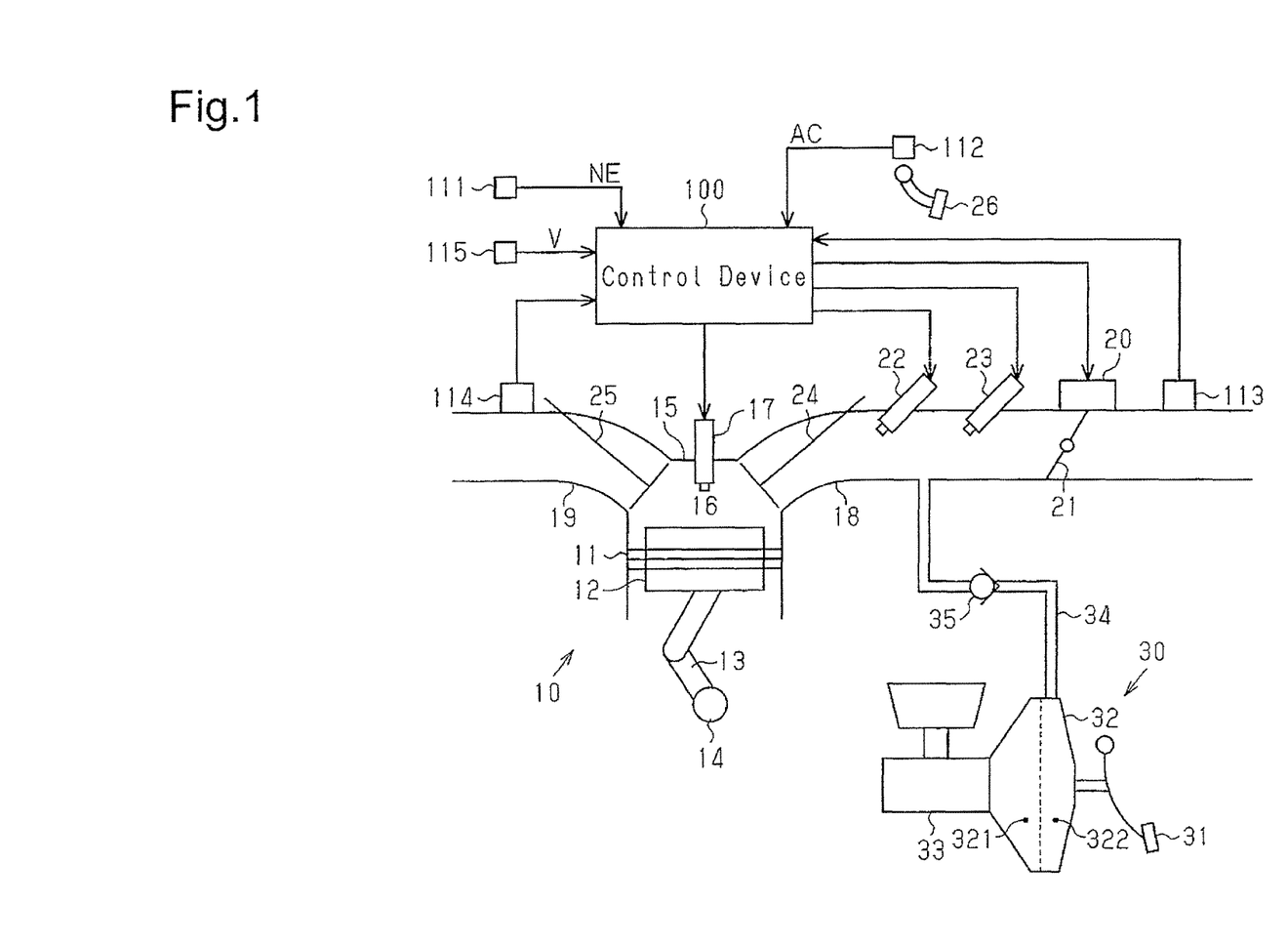
FIG. 1 is a diagram schematically representing the configuration of a portion of a vehicle including a control device according to the present invention.

As illustrated in FIG. 1, an internal combustion engine 10 and a brake unit 30 are mounted in a vehicle. The engine 10 is a bi-fuel type internal combustion engine using gasoline, which is liquid fuel, and CNG, which is gas fuel, in a selectively switchable manner. A piston 12, which reciprocates, is accommodated in a cylinder 11 of the engine 10. Reciprocation of the piston 12 is converted into rotation by a connecting rod 13 and transmitted to a crankshaft 14. The rotation speed NE of the crankshaft 14, which is the engine speed, is detected by a crank position sensor 111.

An inner peripheral surface of the cylinder 11, a top surface of the piston 12, and a cylinder head 15 form a combustion chamber 16. A spark plug 17 is arranged in an upper section of the combustion chamber 16 to face the piston 12. An intake passage 18, in which intake air flows, and an exhaust passage 19, in which exhaust gas discharged from the combustion chamber 16 flows, are connected to the combustion chamber 16.

A throttle valve 21 is arranged in the intake passage 18. The opening degree of the throttle valve 21 is adjusted through actuation of an actuator 20. A first fuel injection valve 22, through which gasoline is injected, and a second fuel injection valve 23, through which CNG is injected, are mounted at a downstream side of the throttle valve 21 in the intake passage 18. Fuel such as gasoline and CNG is injected at the downstream side of the throttle valve 21 in the intake passage 18.

When an intake valve 24 is open, air-fuel mixture containing the gasoline injected through the fuel injection valve 22 or the CNG injected through the fuel injection valve 23 and intake air is supplied from the intake passage 18 to the combustion chamber 16. In the combustion chamber 16, the spark plug 17 ignites the air-fuel mixture. Afterwards, when an exhaust valve 25 is open, exhaust gas is discharged from the combustion chamber 16 into the exhaust passage 19.

The brake unit 30 includes a booster device 32 and a master cylinder 33. The booster device 32 boosts brake manipulation force, which is the force by which the driver manipulates a brake pedal 31. The master cylinder 33 produces fluid pressure corresponding to the brake manipulation force that has been boosted by the booster device 32. The vehicle thus receives braking force corresponding to the fluid pressure produced in the master cylinder 33.

The booster device 32 boosts the brake manipulation force using negative intake pressure at the downstream side of the throttle valve 21 in the intake passage 18. An atmospheric pressure chamber 321 and a negative pressure chamber 322 are formed in the booster device 32. The atmospheric pressure chamber 321 communicates with the atmospheric air. The negative pressure chamber 322 communicates with the downstream side of the throttle valve 21 in the intake passage 18 through a negative pressure supply line 34. A one-way valve 35 is mounted in the negative pressure supply line 34. The one-way valve 35 permits flow of the air from the negative pressure chamber 322 to the intake passage 18 and restricts flow of the air from the intake passage 18 to the negative pressure chamber 322. The pressure in the negative pressure chamber 322 is thus substantially equal to the negative intake pressure. The greater the booster pressure, which corresponds to the pressure difference between the interior of the negative pressure chamber 322 and the interior of the atmospheric pressure chamber 321, the more efficient boosting of the brake manipulation force by the booster device 32. The smaller the pressure in the negative pressure chamber 322, the more likely the booster pressure is to be great. The greater the pressure in the atmospheric pressure chamber 321, the more likely the booster pressure is to be great.

An accelerator depression amount sensor 112, an airflow meter 113, an air-fuel ratio sensor 114, and a vehicle speed sensor 115, in addition to the crank position sensor 111, are electrically connected to the control device 100. The accelerator depression amount sensor 112 detects the accelerator depression amount AC, which is the depression amount of an accelerator pedal 26 manipulated by the driver. The airflow meter 113 detects the flow amount of the air flowing in the intake passage 18. The air-fuel ratio sensor 114 detects the oxygen concentration of the exhaust gas flowing in the exhaust passage 19. Based on the oxygen concentration of the exhaust gas, the air-fuel ratio sensor 114 calculates the air-fuel ratio of the air-fuel mixture that has been burned in the combustion chamber 16. The vehicle speed sensor 115 detects the vehicle speed V. The control device 100 controls the vehicle based on the information detected by various types of detection systems including the sensors 111 to 115.

The fuel injection amount of a single cycle must be greater when the rotation speed NE of the crankshaft 14 in the engine operation using CNG is set as a specific speed than when the rotation speed NE of the crankshaft 14 in the engine operation using gasoline is set as the specific speed. Therefore, the negative intake pressure in the engine operation using CNG is unlikely to be great compared to the negative intake pressure in the engine operation using gasoline. As a result, the booster pressure of the booster device 32 is unlikely to be great, which lowers the boosting efficiency of the brake manipulation force by the booster device 32. With this fact taken into consideration, the control device 100 of the present embodiment estimates the negative intake pressure in the engine operation using CNG and performs a negative pressure recovery procedure to increase the negative intake pressure when an estimate PE of the negative intake pressure is smaller than or equal to a reference value PTh.

As the negative pressure recovery procedure, there is a procedure by which the engine operation using CNG is switched to the engine operation using gasoline. When the fuel is switched from CNG to gasoline in this manner, the fuel injection amount of a single cycle is decreased and the negative intake pressure is increased. This increases the booster pressure, thus canceling lowering of the boosting efficiency of the brake manipulation force by the booster device 32.

A method of estimating the negative intake pressure will hereafter be described with reference to FIG. 2.

Typically, the greater the rotation speed NE of the crankshaft 14, the greater the number of the intake strokes per unit time and the amount of the air drown into the combustion chamber 16. The negative intake pressure is thus likely to be great. Also, the greater the throttle opening degree TH, which is the opening degree of the throttle valve 21, the greater the amount of the intake air flowing in the intake passage 18. The negative intake pressure is thus likely to be small. That is, the estimate PE of the negative intake pressure is basically a value based on the relationship between the rotation speed NE of the crankshaft 14 and the throttle opening degree TH.

However, the negative intake pressure varies depending on a property of fuel such as a property of CNG used in engine operation. That is, the fuel injection amount of a single cycle is likely to be great when the engine operation is carried out using CNG with a property exhibiting low combustion efficiency, compared to when the engine operation is carried out using CNG with a property exhibiting high combustion efficiency. The negative intake pressure is thus unlikely to be great.

Figure 2:
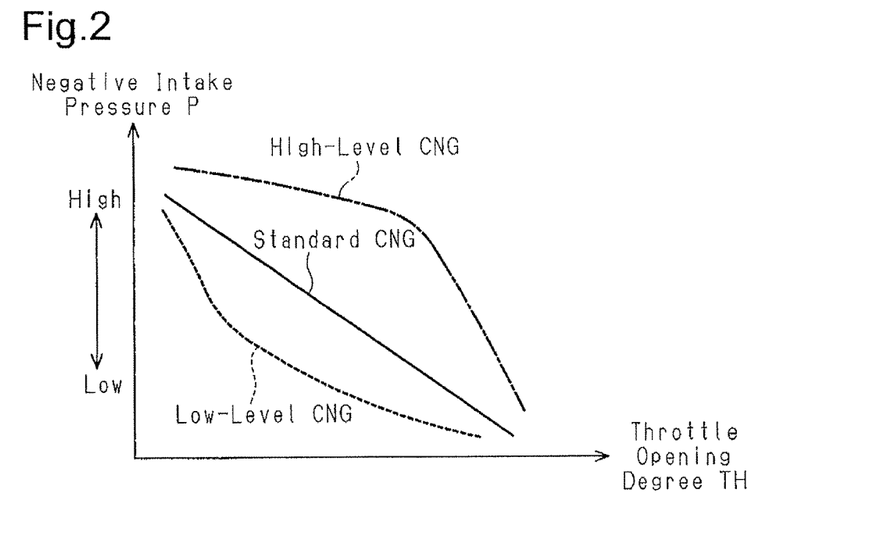
FIG. 2 is a graph representing the relationship between negative intake pressure and a throttle opening degree for respective fuel properties when a crankshaft rotates at a certain speed.

The solid line in FIG. 2 represents the relationship between the negative intake pressure P and the throttle opening degree TH in engine operation using CNG with standard combustion efficiency (hereinafter, referred to as "standard CNG"). The chain curve in the graph represents the relationship between the negative intake pressure P and the throttle opening degree TH in engine operation using CNG with a property exhibiting low combustion efficiency (hereinafter, referred to as "low-level CNG"). The long dashed short dashed curve in the graph represents the relationship between the negative intake pressure P and the throttle opening degree TH in the engine operation using CNG with a property exhibiting high combustion efficiency (hereinafter, referred to as "high-level CNG").

With reference to FIG. 2, regardless of the property of CNG used in the engine operation, the negative intake pressure P becomes greater as the throttle opening degree TH becomes smaller. However, comparison among the properties of CNG shows that the negative intake pressure P with the high-level CNG is greater than the negative intake pressure P with the standard CNG or the low-level CNG. Also, the negative intake pressure P with the low-level CNG is smaller than the negative intake pressure P with the standard CNG or the high-level CNG. Therefore, estimation accuracy of the negative intake pressure is improved by learning the property of the CNG used in engine operation in advance and correcting the estimate PE of the negative intake pressure, which is calculated based on the relationship between the rotation speed NE of the crankshaft 14 and the throttle opening degree TH, in correspondence with the property of the CNG.

The property of CNG is estimated based on the air-fuel ratio of the air-fuel mixture that has been burned in the combustion chamber 16, or, in other words, the correction amount of the CNG injection amount of a single cycle. The CNG injection amount is corrected based on the actual air-fuel ratio, which is calculated based on the detection result of the air-fuel ratio sensor 114, and a target air-fuel ratio. That is, if the actual air-fuel ratio is substantially equal to the target air-fuel ratio, it is determined that the CNG injection amount is appropriate and the injection amount is maintained without correction. If the actual air-fuel ratio is greater than the target air-fuel ratio, it is determined that the CNG injection amount is insufficient and the injection amount is corrected to increase. If the actual air-fuel ratio is smaller than the target air-fuel ratio, it is determined that the CNG injection amount is excessive and the injection amount is corrected to decrease. The CNG injection amount in a case in which the CNG used in engine operation is the standard CNG is defined as a standard injection amount. If the actual injection amount, which is the corrected injection amount, is greater than the standard injection amount, it is determined that the CNG used in the engine operation is the low-level CNG. In contrast, if the actual injection amount is smaller than the standard injection amount, it is determined the CNG used in the engine operation is the high-level CNG.

In the present embodiment, the control device 100 assumes that the CNG used in the engine operation is the standard CNG and calculates the estimate PE of the negative intake pressure based on the relationship between the rotation speed NE of the crankshaft 14 and the throttle opening degree TH. If it is assumed that the actually used CNG is the standard CNG, the estimate PE of the negative intake pressure is maintained without correction. If it is assumed that the actually used CNG is the low-level CNG, the estimate PE of the negative intake pressure, which is based on the rotation speed NE of the crankshaft 14 and the throttle opening degree TH, is corrected to decrease. If it is assumed that the actually used CNG is the high-level CNG, the estimate PE of the negative intake pressure, which is based on the rotation speed NE of the crankshaft 14 and the throttle opening degree TH, is corrected to increase.

The reference value PTh is the value with reference to which a timing for starting the negative pressure recovery procedure is determined. It is thus preferable to set the reference value PTh to a greater value to start the negative pressure recovery procedure earlier as a request of a great deceleration speed (a great braking force) for the vehicle becomes more likely to occur. Cases in which the request of a great deceleration speed for the vehicle is highly likely to occur include a case in which the vehicle speed V is great. The greater the vehicle speed V, the more likely a driver's request of hard braking for the vehicle is to occur. Therefore, the control device 100 sets the reference value PTh to a greater value as the vehicle speed V becomes greater.

The greater the difference between the atmospheric pressure, which is the pressure in the atmospheric pressure chamber 321, and the pressure in the negative pressure chamber 322 corresponding to the negative intake pressure P, the greater the booster pressure. Therefore, when the vehicle runs at a high altitude with a small atmospheric pressure, the booster pressure is unlikely to be great and the boosting efficiency of the brake manipulation force by the booster device 32 is likely to be low. Therefore, the control device 100 controls to start the negative pressure recovery procedure earlier by setting the reference value PTh to a greater value as the atmospheric pressure becomes smaller.

A procedure routine performed by the control device 100 to learn the property of the CNG used in engine operation will hereafter be described with reference to the flowchart of FIG. 3. When the engine is in operation, the procedure routine is carried out for each of the control cycles set in advance.

Figure 3:
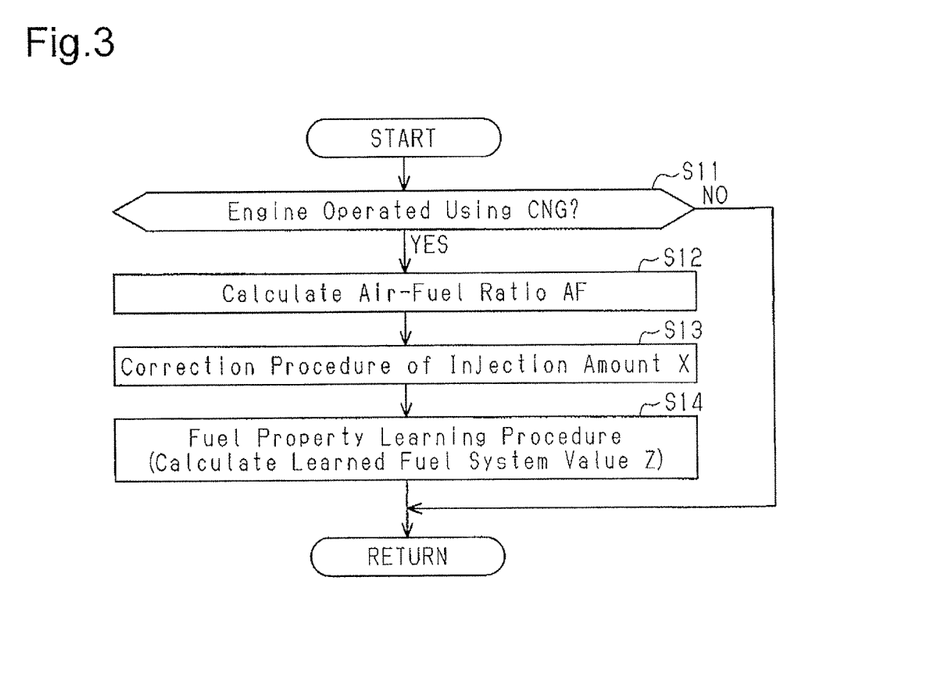
FIG. 3 is a flowchart representing a procedure routine executed to learn a property of CNG used in engine operation.

Referring to FIG. 3, according to the procedure routine, the control device 100 determines whether engine operation using CNG is carried out (Step S11). When engine operation using gasoline is carried out (Step S11: NO), the control device 100 suspends the procedure routine. In contrast, when the engine operation using CNG is carried out (Step S11: YES), the control device 100 calculates the air-fuel ratio AF of the air-fuel mixture that has been burned in the combustion chamber 16 based on the oxygen concentration of the exhaust gas detected by the air-fuel ratio sensor 114 (Step S12). In this manner, the control device 100 functions as an air-fuel ratio calculating section that calculates the air-fuel ratio AF of the air-fuel mixture that has been burned in the combustion chamber 16.

The control device 100 then performs a correction procedure to correct the CNG injection amount X of a single cycle based on the calculated air-fuel ratio AF (Step S13). Subsequently, the control device 100 executes a learning procedure to learn the property of the CNG used in the engine operation (Step S14). At this stage, the control device 100 calculates a learned fuel-system value Z corresponding to the property of the CNG used in the engine operation based on comparison between the actual CNG injection amount X and the standard injection amount. In this manner, the control device 100 functions also as a property learning section that learns the property of the CNG used in the engine operation. The control device 100 then suspends the procedure routine.

Next, with reference to the flowchart of FIG. 4, a procedure routine performed by the control device 100 to determine a timing for starting the negative pressure recovery procedure will be described. When the engine is in operation, the procedure routine is carried out for each of the control cycles set in advance.

Figure 4:
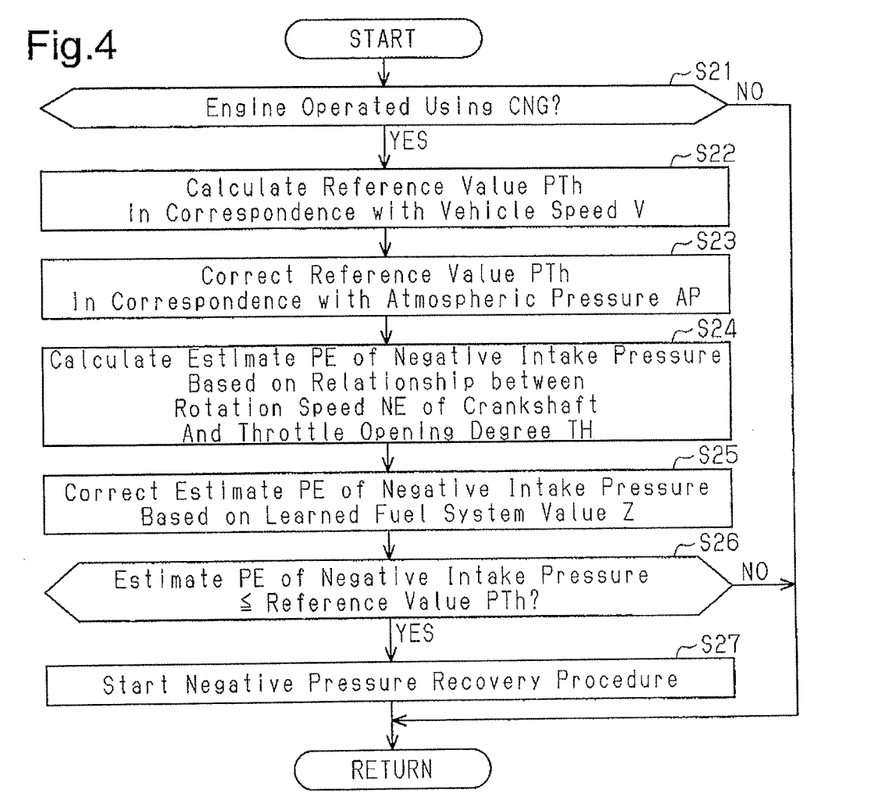
FIG. 4 is a flowchart representing a procedure routine executed to determine a timing for starting a negative pressure recovery procedure.

Referring to FIG. 4, the control device 100 determines whether engine operation using CNG is carried out (Step S21). If engine operation using gasoline is carried out (Step S21: NO), the control device 100 suspends the procedure routine. In contrast, if the engine operation using CNG is carried out (Step S21: YES), the control device 100 calculates the reference value PTh in correspondence with the vehicle speed V (Step S22). In this manner, the control device 100 functions also as a reference vehicle speed determining section that sets the reference value PTh to a greater value as the vehicle speed V becomes greater.

Subsequently, the control device 100 corrects the reference value PTh calculated in Step S22 in correspondence with the atmospheric pressure AP (Step S23). In this manner, the control device 100 functions also as a reference atmospheric pressure determining section that sets the reference value PTh to a greater value as the atmospheric pressure AP becomes smaller.

Then, the control device 100 calculates the estimate PE of the negative intake pressure based on the relationship between the rotation speed NE of the crankshaft 14 and the throttle opening degree TH (Step S24). The estimate PE of the negative intake pressure is a value calculated on the assumption that the CNG used in the engine operation is the standard CNG. In this manner, the control device 100 functions also as a negative pressure estimating section. Subsequently, the control device 100 corrects the estimate PE of the negative intake pressure calculated in Step S24 based on the learned fuel-system value Z calculated in Step S14 (Step S25). For example, if the CNG used in the engine operation is the high-level CNG, the estimate PE of the negative intake pressure is corrected to increase. If the CNG used in the engine operation is the low-level CNG, the estimate PE of the negative intake pressure is corrected to decrease. If the CNG used in the engine operation is the standard CNG, the estimate PE of the negative intake pressure is maintained without correction. In this manner, the control device 100 functions also as a negative pressure correcting section that sets the estimate PE of the negative intake pressure to a greater value as the property of the CNG used in the engine operation exhibits higher combustion efficiency.

Then, the control device 100 determines whether the calculated estimate PE of the negative intake pressure is smaller than or equal to the reference value PTh (Step S26). If the estimate PE of the negative intake pressure is greater than the reference value PTh (Step S26: NO), the control device 100 suspends the procedure routine without starting the negative pressure recovery procedure. In contrast, if the estimate PE of the negative intake pressure is smaller than or equal to the reference value PTh (Step S26: YES), the control device 100 starts the negative pressure recovery procedure (Step S27) and, afterwards, ends the procedure routine.

Operation of the vehicle including the control device 100 of the present embodiment will hereafter be described.

In the engine operation using CNG, the estimate PE of the negative intake pressure is calculated. The estimate PE of the negative intake pressure is a value corresponding to the property of the CNG used in the engine operation. If the CNG used in the engine operation is the high-level CNG, the estimate PE of the negative intake pressure is great compared to a case in which the estimate PE of the negative intake pressure is maintained without correction corresponding to the property of the CNG. The negative pressure recovery procedure is thus unlikely to be started. This restrains starting of the negative pressure recovery control at a stage at which the actual negative intake pressure is great and the boosting efficiency of the brake manipulation force by the booster device 32 is in a tolerable range.

In contrast, if the CNG used in the engine operation is the low-level CNG, the estimate PE of the negative intake pressure is small compared to a case in which the estimate PE of the negative intake pressure is maintained without correction corresponding to the property of the CNG. The negative pressure recovery procedure is thus started early. This makes it unlikely that the negative pressure recovery control is not performed despite the fact that the actual negative intake pressure is small and the boosting efficiency of the brake manipulation force by the booster device 32 is small.

As the negative pressure recovery procedure is started, the engine operation using CNG is switched to the engine operation using gasoline. After gasoline injection into the intake passage 18 is started, the fuel injection amount of a single cycle is decreased and the negative intake pressure P is increased correspondingly. As a result, the pressure in the negative pressure chamber 322 of the booster device 32 is decreased and the booster pressure is increased. This cancels lowering of the boosting efficiency of the brake manipulation force by the booster device 32.

The configuration and operation described above have the advantages described below.

(1) The property of the supplied gas fuel may vary depending on the equipment that supplies the gas fuel to the vehicle. When the engine is operated using gas fuel with low combustion efficiency, the air-fuel ratio of the air-fuel mixture that has been burned in the combustion chamber is likely to be greater than the target air-fuel ratio. Therefore, in the engine operation using the gas fuel with low combustion efficiency, the fuel injection amount of a single cycle is increased such that the air-fuel ratio approximates the target air-fuel ratio. When the fuel injection amount of a single cycle is increased, the negative intake pressure at the downstream side of the throttle valve in the intake passage is unlikely to be great. In contrast, when the engine is operated using gas fuel with high fuel combustion efficiency, the air-fuel ratio of the air-fuel mixture that has been burned in the combustion chamber is likely to be smaller than the target air-fuel ratio. Therefore, in the engine operation using the gas fuel with high combustion efficiency, the fuel injection amount of a single cycle is decreased such that the air-fuel ratio approximates the target air-fuel ratio. When the fuel injection amount of a single cycle is decreased, the negative intake pressure is likely to be great. As has been described, the negative intake pressure is likely to vary depending on the property of the gas fuel used in the engine operation.

However, in the present embodiment, the estimate PE of the negative intake pressure, which is based on the rotation speed NE of the crankshaft 14 and the throttle opening degree TH, is corrected in correspondence with the property of the CNG used in the engine operation. By taking the property of the used CNG into consideration, the estimate PE of the negative intake pressure is brought close to the actual negative intake pressure. This ensures accurate estimation of the negative intake pressure P and appropriate determination of a timing for starting the negative pressure recovery procedure.

(2) The greater the vehicle speed V, the more likely a request of a great deceleration speed for the vehicle is to occur. When a great deceleration speed is requested, it is preferable to increase the boosting efficiency of the brake manipulation force by the booster device. In this regard, in the present embodiment, the control device 100 functions also as the reference vehicle speed determining section that sets the reference value PTh to a greater value as the vehicle speed becomes greater. In this configuration, the reference value PTh for determining a timing for starting the negative pressure recovery procedure is determined in correspondence with the vehicle speed V. Specifically, the negative pressure recovery procedure is started at a stage at which the negative intake pressure is comparatively great when the vehicle speed V is great, compared to when the vehicle speed V is small. Therefore, the negative pressure recovery procedure is started earlier as the vehicle speed V becomes greater and a driver's request of a great deceleration speed for the vehicle becomes more likely to occur. As a result, when the brake is manipulated by the driver, the vehicle obtains the great deceleration speed.

(3) The booster device 32 has the negative pressure chamber 322, which communicates with the intake passage 18. The booster pressure of the booster device 32 is a value corresponding to the difference between the pressure in the negative pressure chamber 322 and the atmospheric pressure AP. Therefore, at a high altitude with a small atmospheric pressure AP, the boosting efficiency of the brake manipulation force by the booster device 32 is unlikely to be great. In this regard, in the present embodiment, the control device 100 functions also as the reference atmospheric pressure determining section that sets the reference value PTh to a greater value as the atmospheric pressure AP becomes smaller. In this configuration, the reference value PTh is corrected in correspondence with the atmospheric pressure AP. Specifically, the negative pressure recovery procedure is started at a stage at which the negative intake pressure is comparatively great when the atmospheric pressure AP is small and the booster pressure is unlikely to be great. Therefore, the negative pressure recovery procedure is started earlier as the atmospheric pressure AP becomes smaller and the booster pressure becomes more unlikely to be great. As a result, lowering of the boosting efficiency of the brake manipulation force by the booster device 32 caused by a small atmospheric pressure AP is canceled early.

(4) The combustibility of gasoline is greater than the combustibility of CNG. To ensure engine output equal to engine output of engine operation using gasoline, the fuel injection amount of a single cycle of engine operation using CNG must be greater than that of the engine operation using gasoline. Therefore, in the engine operation using gasoline, the fuel injection amount of a single cycle is likely to be small and, correspondingly, the negative intake pressure is likely to be great compared to when CNG is used. In the present embodiment, the internal combustion engine 10 mounted in the vehicle is a bi-fuel type internal combustion engine that uses gasoline, which is liquid fuel, and CNG, which is gas fuel, in a selectively switchable manner. In this case, in the engine operation using CNG, the control device 100 serving as the recovery control section starts the negative pressure recovery procedure when the corrected estimate PE of the negative intake pressure becomes smaller than or equal to the reference value. As the negative pressure recovery procedure is started, the engine operation using CNG is switched to the engine operation using gasoline. This increases the negative intake pressure and the booster pressure, thus canceling lowering of the boosting efficiency of the brake manipulation force by the booster device 32.

The illustrated embodiment may be modified to the forms described below.

As long as variation of the booster pressure caused by variation of the atmospheric pressure AP is in a tolerable range, the reference value PTh does not necessarily have to be corrected in correspondence with the atmospheric pressure AP. This configuration also ensures the same advantages as the above-described advantages (1) and (2).

The reference value PTh may be determined without referring to the vehicle speed V. In this case, by changing the reference value PTh in correspondence with the atmospheric pressure AP, the same advantages as the above-described advantages (1) and (3) are ensured.

The reference value PTh may be determined without referring to the vehicle speed V or the atmospheric pressure AP. That is, the reference value PTh may be fixed to a certain value. Also in this case, the same advantage as the advantage (1) is ensured.

The greater the accelerator depression amount AC, the more likely the throttle opening degree TH is to be great. Therefore, the estimate PE of the negative intake pressure may be calculated using the accelerator depression amount AC, instead of the throttle opening degree TH. This configuration also ensures the same advantage as the advantage (1).

In the illustrated embodiment, the estimate PE of the negative intake pressure is corrected in a stepped manner, depending on which of the CNGs, the standard CNG, the high-level CNG, or the low-level CNG, is used in the engine operation. However, the estimate PE of the negative intake pressure may be corrected such that, as the combustion efficiency of the CNG becomes higher, the estimate PE of the negative intake pressure becomes gradually greater.

Figure 5:
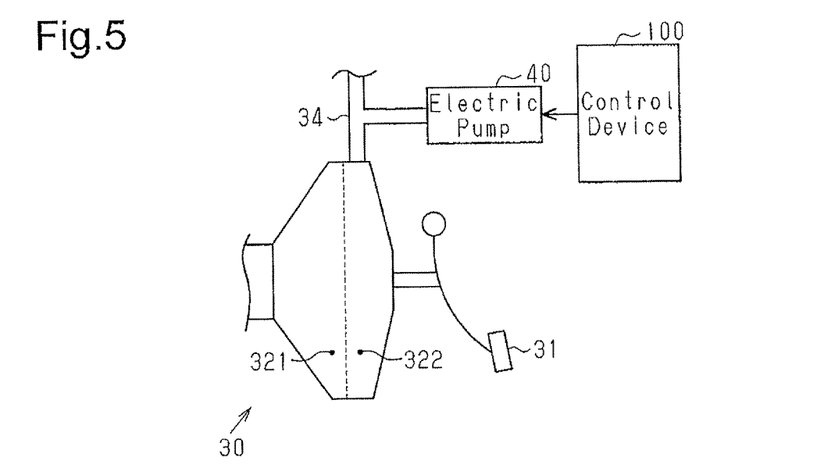
FIG. 5 is a diagram schematically representing the configuration of a portion of a vehicle including a control device of another example.

With reference to FIG. 5, in a case of a vehicle including an electric pump 40 that depressurizes the negative pressure chamber 322 of the booster device 32, the negative pressure recovery procedure may include a procedure by which engine operation using CNG is switched to engine operation using gasoline and a procedure by which the negative pressure chamber 322 is depressurized through actuation of the electric pump 40. In this configuration, by actuating the electric pump 40, the interior of the negative pressure chamber 322 of the booster device 32 is depressurized. This increases the booster pressure, thus canceling lowering of the boosting efficiency by the booster device 32.

The vehicle including the electric pump 40 may be a vehicle having a mono-fuel type internal combustion engine that performs only engine operation using CNG. In this case, the negative pressure recovery procedure includes only a procedure by which the electric pump 40 is actuated.

The negative pressure recovery procedure is not restricted to the procedure by which engine operation using CNG is switched to engine operation using gasoline. For example, the negative pressure recovery procedure may be a procedure by which the negative intake pressure P is increased by decreasing the throttle opening degree TH. Further, the negative pressure recovery procedure may be a procedure by which the ignition timing is retarded.

The invention claimed is:

1. A control device for a vehicle having an internal combustion engine operated using a gas fuel and a booster device that boosts brake manipulation force using negative intake pressure at a downstream side of a throttle valve in an intake passage, the control device comprising:

a negative pressure estimating section that calculates an estimate of the negative intake pressure based on the relationship between an opening degree of the throttle valve or a depression amount of an accelerator pedal and an engine speed; and a recovery control section that determines, based on the estimate of the negative intake pressure, a timing for starting a negative pressure recovery procedure by which booster pressure of the booster device is increased, wherein the control device includes a negative pressure correcting section that sets the estimate of the negative intake pressure calculated by the negative pressure estimating section to a greater value as combustion efficiency of the gas fuel used in engine operation becomes higher, and when the estimate of the negative intake pressure that has been corrected by the negative pressure correcting section becomes smaller than or equal to a reference value, the recovery control section starts the negative pressure recovery procedure.

2. The control device according to claim 1, comprising a reference vehicle speed determining section that sets the reference value to a greater value as a vehicle speed becomes greater.

3. The control device according to claim 1, comprising a reference atmospheric pressure determining section that sets the reference value to a greater value as the atmospheric pressure becomes smaller.

4. The control device according to claim 1, wherein
the internal combustion engine is a bi-fuel type internal combustion engine that uses the gas fuel and a liquid fuel in a selectively switchable manner,
in engine operation using the gas fuel, the recovery control section starts the negative pressure recovery procedure when the estimate of the negative intake pressure that has been corrected by the negative pressure correcting section becomes smaller than or equal to the reference value, and
the negative pressure recovery procedure switches the engine operation using the gas fuel to engine operation using the liquid fuel.

5. The control device according to claim 1, wherein
an electric pump that depressurizes the interior of a negative pressure chamber of the booster device is arranged in the vehicle, and
the negative pressure recovery procedure includes a procedure by which the electric pump is actuated to depressurize the interior of the negative pressure chamber.

6. The control device according to claim 1, comprising:
an air-fuel ratio calculating section that calculates an air-fuel ratio of an air-fuel mixture that has been burned in a combustion chamber of the internal combustion engine; and
a property learning section that learns a property of the gas fuel used in the engine operation,
wherein the property learning section determines that the combustion efficiency of the gas fuel used in the engine operation is small if an injection amount of the gas fuel for a single cycle is corrected to increase based on the relationship between the air-fuel ratio calculated by the air-fuel ratio calculating section and a target air-fuel ratio, the property learning section determining that the combustion efficiency of the gas fuel used in the engine operation is great if an injection amount of the gas fuel for a single cycle is corrected to decrease based on the relationship between the air-fuel ratio calculated by the air-fuel ratio calculating section and the target air-fuel ratio.

\* \* \* \* \*